US012624916B2

(12) United States Patent
Schaap et al.

(10) Patent No.: US 12,624,916 B2
(45) Date of Patent: May 12, 2026

(54) DRY FIRE DEVICE USING SOUND DETECTION

(71) Applicant: S.M. Innovation Ltd., Luzit (IL)

(72) Inventors: Hanan Schaap, Luzit (IL); Nir Dvash, Ramat Hagolan (IL)

(73) Assignee: S.M. Innovation Ltd., Luzit (IL)

( * ) Notice: Subject to any disclaimer, the term of this patent is extended or adjusted under 35 U.S.C. 154(b) by 384 days.

(21) Appl. No.: 18/406,243

(22) Filed: Jan. 8, 2024

(65) Prior Publication Data

US 2024/0384962 A1 Nov. 21, 2024

Related U.S. Application Data

(60) Provisional application No. 63/581,738, filed on Sep. 11, 2023, provisional application No. 63/479,219, filed on Jan. 10, 2023.

(51) Int. Cl.
*F41A 33/02* (2006.01)
*G09B 19/00* (2006.01)
*H04R 1/02* (2006.01)

(52) U.S. Cl.
CPC .............. *F41A 33/02* (2013.01); *H04R 1/028* (2013.01); *G09B 19/00* (2013.01)

(58) Field of Classification Search
None
See application file for complete search history.

(56) References Cited

U.S. PATENT DOCUMENTS

2007/0122770 A1* 5/2007 Swensen ............ A62C 99/0081
434/16

* cited by examiner

*Primary Examiner* — James B Hull
(74) *Attorney, Agent, or Firm* — Dekel Patent Ltd.; David Klein

(57) ABSTRACT

A dry fire device includes a housing, and a weapon-usage activation assembly, which includes a microphone, a controller and a memory. The microphone is configured to sense a sound during use of the dry fire device, and the controller is configured to extract amplitude and frequency data of the sound and compare it to a range of values stored in the memory. If the sensed sound is in the range, the controller is configured to command the weapon-usage activation assembly to initiate a weapon-usage activity, and if not in the range, no weapon-usage activity is initiated.

11 Claims, 3 Drawing Sheets

DRY FIRE DEVICE USING SOUND DETECTION

FIELD OF THE INVENTION

The present invention relates to dry fire training devices for use in weapons, and particularly to a dry fire device that initiates a weapon-usage action, such as but not limited to, emission of a light beam, activation of a shooting simulator or processing actions of the shooter, upon detection of a sound related to moving a trigger of the weapon.

BACKGROUND OF THE INVENTION

Dry fire training typically involves drawing, aiming and firing without ammunition. However, since there is no ammunition, the shooter has no knowledge of the impact point if live ammunition had been used. This limits the value of training because the shooter cannot evaluate his/her performance.

U.S. Pat. No. 5,909,951 describes an optical cartridge adapted to be used in a weapon for emission of a light signal when the weapon is fired. The cartridge includes a battery and a light source energized by the battery so that a visible or an invisible light beam will be emitted. A firing switch is operated by the weapon trigger. This system emits a light upon pressing the trigger and the light provides informational feedback relating to the quality of the aiming process.

SUMMARY

The present invention seeks to provide a dry fire device that initiates a weapon-usage action, such as but not limited to, emission of a light beam, activation of a shooting simulator or processing actions of the shooter, upon detection of sound related to moving a trigger of the weapon. Movement of the trigger includes pulling a trigger to fire live (lethal or non-lethal) ammunition; or pulling a trigger of a weapon in which is mounted a dry fire device, such as but not limited to, a dry fire cartridge or a magazine for dry fire training or other weapon accessory that can be used for dry fire training, wherein pulling the trigger creates a sound, such as but not limited to, a clicking sound, toggle sound and others. The scope of the invention includes sound caused directly or indirectly by movement of the trigger. In one non-limiting embodiment, a light beam is emitted that indicates to the shooter where the target would have been hit if a live bullet had been shot at the target.

The dry fire device may be mounted on the weapon in any manner, such as but not limited to, by being inserted into the chamber of the weapon in the same manner as live ammunition, or by being attached to the outside of the barrel or to a Picatinny rail or to a magazine well, handle, or any other portion of the weapon. In any case, no matter where it is mounted, the dry fire device does not have to be aligned with the weapon's barrel. The dry fire device works with a microphone (i.e., any sensor for sensing sound) to sense sound produced by movement of the trigger (again, this includes sound caused directly or indirectly by movement of the trigger). A controller, which is in communication with the microphone, analyzes the sensed sound and extracts data including the amplitude and frequency (such as the main frequency) of the sound. The controller initiates a weapon-usage action, such as but not limited to, emission of a light beam, activation of a shooting simulator or processing actions of the shooter. The shooter can train the controller to initiate the weapon-usage action in accordance with a specific amplitude and frequency of sound. This reduces or eliminates "false" actions (e.g., light emission) caused by other sounds that could mistakenly be interpreted by the controller as the sound caused by movement of the trigger.

The learning process may include the steps of firing the weapon; sensing the sound caused by movement of the trigger; storing the amplitude and frequency of the sensed sound; repeating these steps for a desired number of times; and averaging the data to define a range of values both for the amplitude and for the frequency of the detected sound. This range then serves as the "learned" range of sounds that will initiate a weapon-usage action (e.g., emission of light from the cartridge).

When in regular use, the system will sense a sound, extract its amplitude and frequency data and compare it to the stored range of values in order to make a decision about initiating the weapon-usage action or not.

There is thus provided in accordance with a non-limiting embodiment of the invention a dry fire device including a housing, a weapon-usage activation assembly, optionally mounted in the housing, which includes a weapon-usage activation switch, a microphone, a controller and a memory, and optionally a battery mounted in the housing for energizing the weapon-usage activation assembly, and wherein the microphone is configured to sense a sound during use of the dry fire device, and the controller is configured to extract amplitude and frequency data of the sound and compare it to a range of values stored in the memory, and if the sensed sound is in the range, the controller is configured to command the weapon-usage activation assembly to initiate a weapon-usage activity, and if not in the range, no weapon-usage activity is initiated.

In accordance with a non-limiting embodiment of the invention the illumination assembly includes an on-off switch and the housing includes an access opening for gaining access to the on-off switch. The illuminator may be a laser diode or any other electronic device or electronic signal receiver or transmitter.

In accordance with a non-limiting embodiment of the invention the illumination assembly includes a battery contact for contacting the battery.

In accordance with a non-limiting embodiment of the invention the housing includes a forward housing assembled to a rearward housing.

In accordance with a non-limiting embodiment of the invention an electrically insulating sleeve insulates electrical components of the housing from inner walls of the housing.

BRIEF DESCRIPTION OF DRAWINGS

The present invention will be understood and appreciated more fully from the following detailed description, taken in conjunction with the drawings in which.

3

Figure 5:
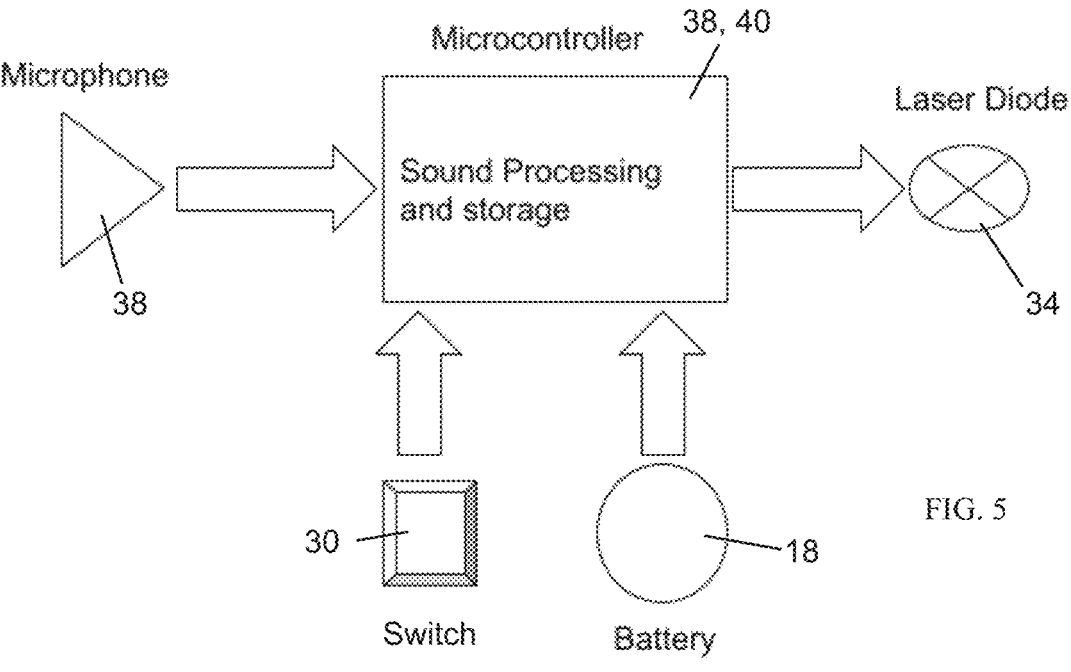

FIG. 5 is a simplified block diagram of the interaction between the microphone, controller, memory and illuminator.

Figure 6:
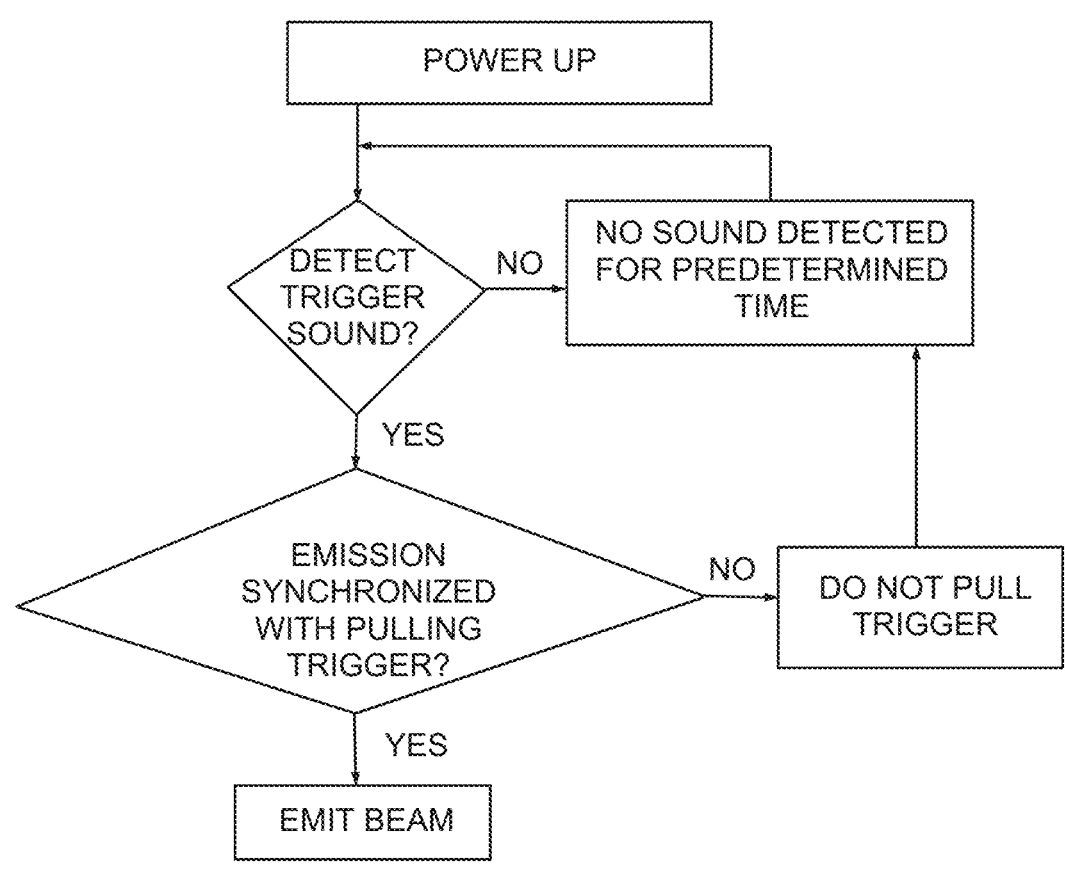

FIG. 6 is a simplified flow chart of using the illumination assembly of the dry fire device for single-action, double-action or striker-action firearms, in accordance with a non-limiting embodiment of the present invention.

DETAILED DESCRIPTION

Figure 1:
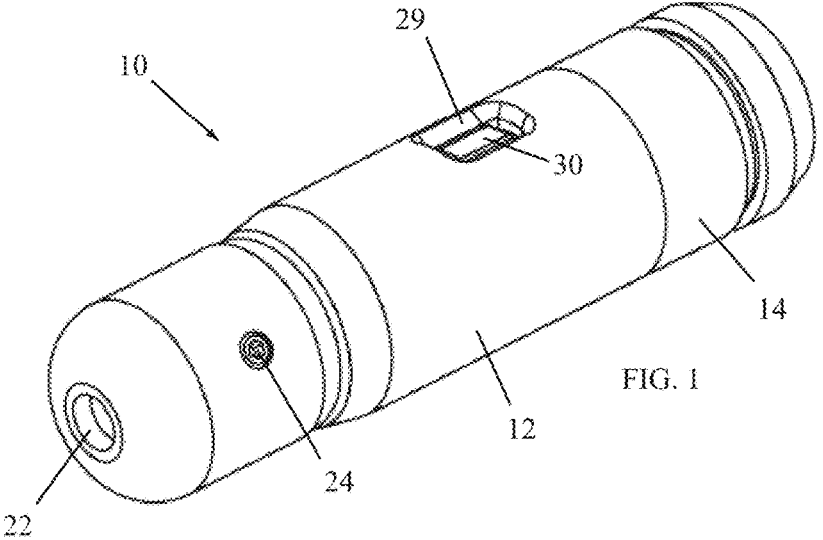
FIG. 1 is a simplified perspective illustration of a dry fire device, in this case a dry fire cartridge, in accordance with a non-limiting embodiment of the present invention.
Figure 2:
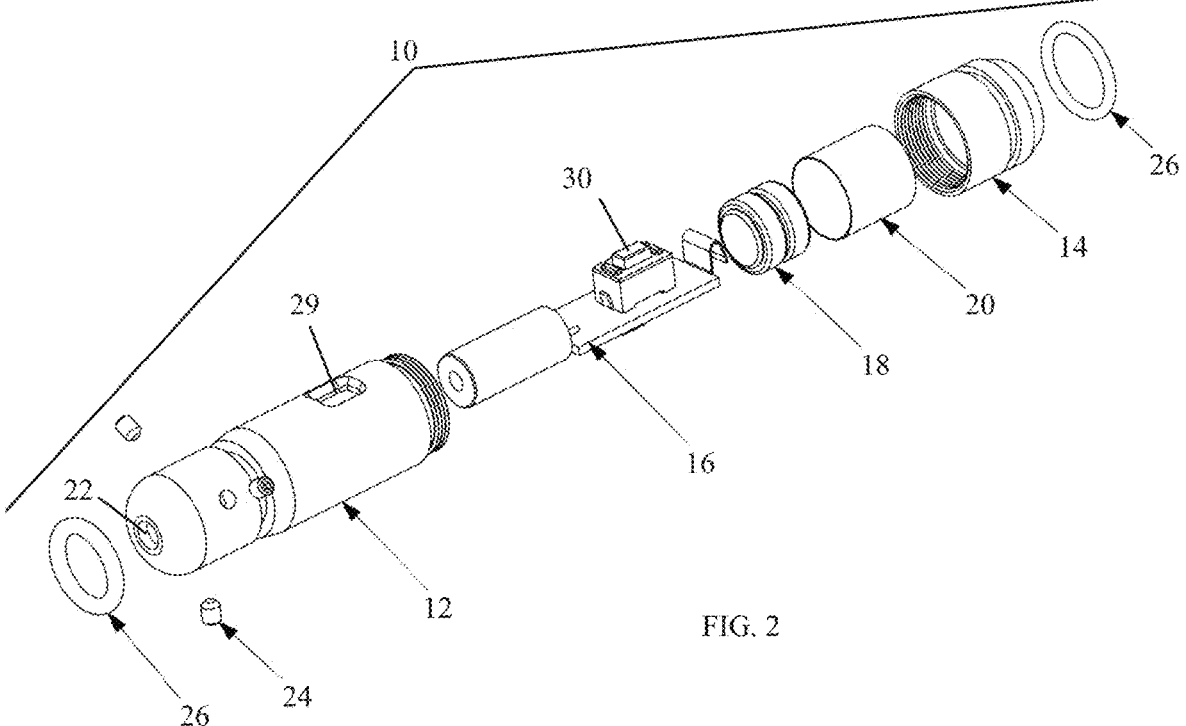
FIG. 2 is an exploded illustration of the dry fire cartridge, showing the inner elements of the dry fire cartridge.

Reference is now made to FIGS. 1 and 2, which illustrate a dry fire device 10, in accordance with a non-limiting embodiment of the present invention. In this embodiment, the device is a cartridge, so in the description it is also referred to as a dry fire cartridge 10.

As seen in FIG. 2, dry fire device 10 may include a housing, which in the following description for dry fire cartridge 10 is referred to as a cartridge housing, such as a forward cartridge housing 12 and a rearward cartridge housing 14, which can be assembled to each other such as by threaded connection.

A weapon-usage activation assembly 16 (described more in detail with reference to FIGS. 3 and 4) is mounted in the dry fire cartridge 10. In one non-limiting embodiment of the invention, the weapon-usage activation assembly 16 is an illumination assembly and the description follows for now for the illumination assembly 16 (other examples of the weapon-usage activation assembly are given below.) The illumination assembly 16 may be energized by one or more batteries 18. An electrically insulating sleeve 20 may insulate the battery 18 and the illumination assembly 16 from the inner walls of the cartridge housing.

The forward cartridge housing 12 may include a forward window 22 through which a light beam can be emitted from the illumination assembly 16. The illumination assembly 16 may be secured in place by one or more fasteners 24, such as pins or set screws. One or more seals 26, such as O-rings, may be placed inside the cartridge housing, such as at the forward and rearward ends of the cartridge, to seal the assembly from moisture and contaminants.

The forward cartridge housing 12 may include an access opening 29 for gaining access to an on-off switch 30 of the illumination assembly 16.

Figure 3:
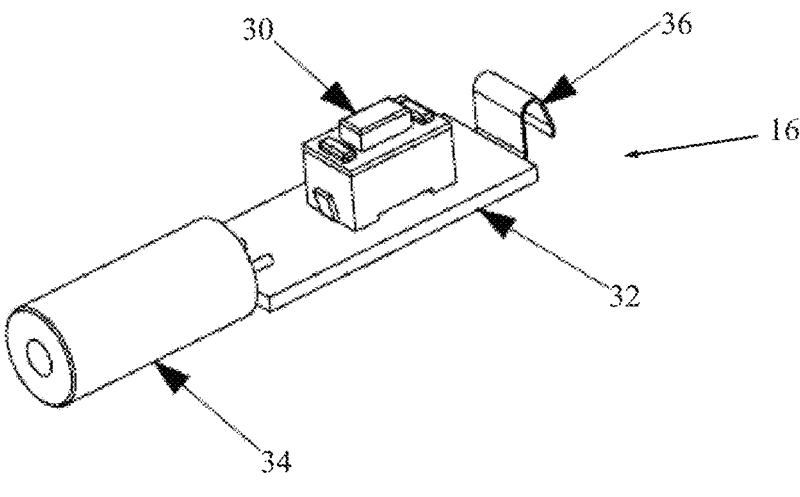
FIG. 3 is an upper perspective illustration of the illumination and controller electronics (illumination assembly) of the dry fire cartridge, showing the illuminator with an on-off switch.
Figure 4:
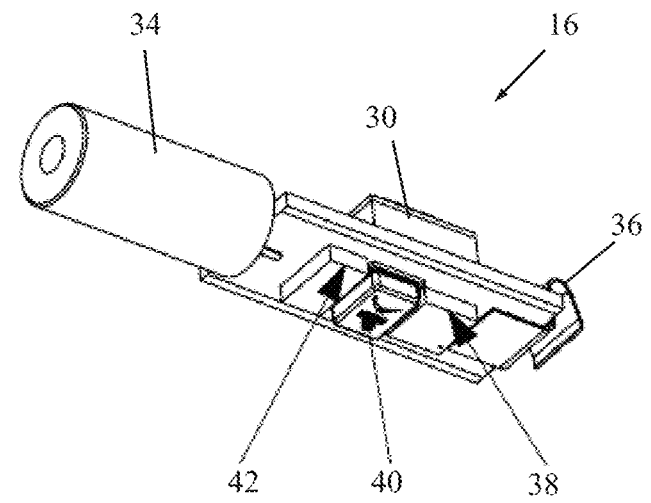
FIG. 4 is a lower perspective illustration of the illumination and controller electronics (illumination assembly) of the dry fire cartridge, showing the microphone, controller and memory components.

Reference is now made to FIGS. 3 and 4. The illumination assembly 16 may include a printed circuit board 32 on which are mounted the on-off switch 30 and an illuminator 34, such as but not limited to, a laser diode which can emit light of any wavelength (or wavelengths outside the visible light spectrum). As seen in FIG. 3, illumination assembly 16 may include a battery contact 36, for example, a battery contact leaf spring, such as but not limited to, part 36-110TR-ND, commercially available from Keystone Electronics.

As seen in FIG. 4, illumination assembly 16 may further include a microphone 38, a controller 40 and a memory 42 ("a" meaning, throughout the disclosure, one or more of each of these components), such as but not limited to, EEPROM (electrically erasable programmable read-only memory), RAM (random access memory), or other kinds of flash memories or other kinds of memories. The device may optionally have an aperture near the microphone for improving its ability to sense sounds.

Reference is now made to FIG. 5, which is a simplified block diagram of the interaction between the microphone 38, controller 40, memory 42 and illuminator 34.

In use, the shooter first turns on the on-off switch 30 to activate the dry fire cartridge 10, and then loads the cartridge into the chamber of the weapon (or as mentioned above, any other portion of the weapon). The cartridge can be loaded into the chamber by stripping it from a magazine, or by any other method.

The shooter can train the controller to cause emission of light from the dry fire cartridge in accordance with a specific amplitude and frequency of sound. This reduces or eliminates "false" light emission caused by other sounds that could be incorrectly interpreted by the controller to be the sound caused by movement of the trigger.

The learning process may include the steps of firing the weapon; sensing the sound caused by movement of the trigger with microphone 38 (this includes sound caused directly or indirectly by movement of the trigger); using controller 40 to store the amplitude and frequency of the sensed sound in memory 42; repeating these steps for a desired number of times; and using controller 40 to average the data to define a range of values both for the amplitude and for the frequency of the detected sound. This range then serves as the "learned" range of sounds for the controller 40. When in regular use, the microphone 38 senses a sound, and controller 40 extracts the amplitude and frequency data and compares it to the stored range of values in memory 42. If the sensed sound is in this range, controller 40 will command illuminator 34 to emit a light beam; if not in the range, no light beam will be emitted.

It is noted that the illumination assembly of the dry fire device may be used with any kind of action, such as single-action, double-action or striker-action firearms, in accordance with a non-limiting embodiment of the present invention, an example of which is now described with reference to FIG. 6.

Depending on the type of action, there may be two sounds: a first sound of pulling the trigger and a second sound of releasing the trigger. For purposes of illumination, the illuminator 34 should emit the light beam only at the pull of the trigger and not while the trigger is released. However, since two sounds are sensed, both the pull and the release of the trigger may cause emission of the light beam. One solution is to have the illumination assembly command the illuminator to emit a light beam only at one out of every two recognitions of sound (the pull sound). This works well but there could be situations where one of the sounds was not recognized correctly by the illumination assembly, which could cause the illuminator to emit a light beam at the release of the trigger and not while it is pulled.

In any case, no matter what the action, there is a sound caused by movement of the trigger. It is desired that this sound which is detected by the illumination assembly should cause emission of the light beam to be synchronized with pulling the trigger, and not with releasing the trigger. As seen in FIG. 6, if for some reason, emission has become unsynchronized with pulling the trigger (for example, light is emitted upon releasing the trigger), the invention has a reset feature. The reset feature, in one embodiment, is a re-sync mechanism embedded in the logic of the illumination assembly. If the user notices that the illuminator is emitting a light beam not in synchronization with the trigger pull, the user may simply stop pulling the trigger so that no sound is detected for a predetermined time (e.g., two seconds) and the logic of the illumination assembly will resynchronize such that the next trigger pull will activate the illuminator. This process can be repeated as many times as needed.

Alternatively, the reset feature is a user-operated button or other kind of switch that resets and resynchronizes the illumination assembly such that the next trigger pull will activate the illuminator.

In another embodiment of the invention, in addition or in place of the illumination assembly, the sensor or sensors that sense the sound caused by movement of the trigger may be in communication with other kinds of shooting simulators or with a device that measures or processes the actions of the shooter, such as but not limited to, the MANTIS X10 shooting performance system.

Accordingly, the weapon-usage activation assembly does not have to be an illumination assembly. In such an embodiment, there is no need for window 22, and the controller may include switching circuitry for activating the shooting simulator or the device that measures or processes the actions of the shooter.

The invention claimed is:

1. A dry fire device comprising:

a housing;

a weapon-usage activation assembly, which comprises a microphone, a controller and a memory; and wherein said microphone is configured to sense a sound during use of said dry fire device, and said controller is configured to extract amplitude and frequency data of said sound and compare it to a range of values stored in said memory, and if the sensed sound is in said range, said controller is configured to command said weapon-usage activation assembly to initiate a weapon-usage activity, and if not in said range, no weapon-usage activity is initiated.

2. The dry fire device according to claim 1, wherein said weapon-usage activation assembly is mounted in said housing.

3. The dry fire device according to claim 1, wherein said weapon-usage activation assembly comprises an on-off switch and said housing comprises an access opening for gaining access to said on-off switch.

4. The dry fire device according to claim 1, wherein said weapon-usage activation assembly comprises an illumination assembly which comprises an illuminator configured to emit a light beam.

5. The dry fire device according to claim 1, wherein a battery is mounted in said housing for energizing said weapon-usage activation assembly.

6. The dry fire device according to claim 4, wherein said housing comprises a forward window through which a light beam can be emitted from said illuminator.

7. The dry fire device according to claim 4, wherein said illuminator comprises a laser diode.

8. The dry fire device according to claim 1, wherein said housing comprises a forward housing assembled to a rearward housing.

9. The dry fire device according to claim 1, further comprising an electrically insulating sleeve that insulates electrical components of said housing from inner walls of said housing.

10. The dry fire device according to claim 1, wherein said weapon-usage activation assembly comprises a re-sync mechanism wherein if no sound is detected for a predetermined time, said illumination assembly resynchronizes such that a subsequent trigger pull activates said weapon-usage activation assembly.

11. The dry fire device according to claim 1, wherein said microphone is in communication with a shooting performance system or shooting simulator.

* * * * *